Patented July 17, 1923.

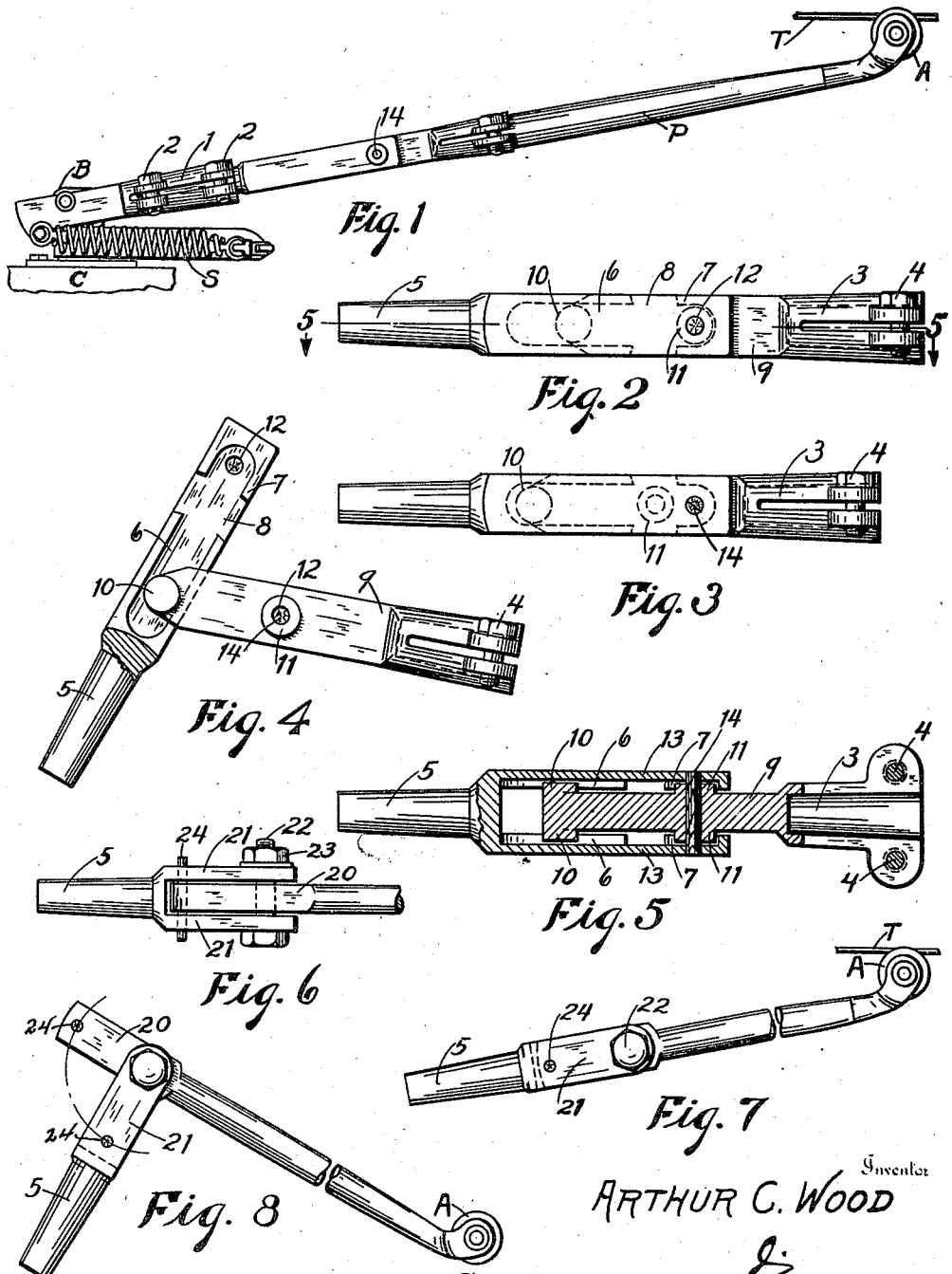

1,461,813

UNITED STATES PATENT OFFICE.

ARTHUR C. WOOD, OF MANSFIELD, OHIO, ASSIGNOR TO THE OHIO BRASS COMPANY, OF MANSFIELD, OHIO, A CORPORATION OF NEW JERSEY.

SAFETY SUPPORT FOR CURRENT COLLECTORS.

Application filed January 27, 1923. Serial No. 615,249.

*To all whom it may concern:*

Be it known that I, ARTHUR C. WOOD, a citizen of the United States of America, residing at Mansfield, in the county of Richland and State of Ohio, have invented certain new and useful Improvements in Safety Supports for Current Collectors, of which the following is a specification.

My invention relates to trolley poles adapted for the mounting of a current collector thereon and has particular reference to that type of pole which can be brought out of danger of engagement with the overhead supporting structure for the trolley wire providing the current collector leaves the trolley wire.

The object of my invention is to provide means whereby the pole may be jointed and pivotally mounted at the joint so that one portion of the pole may swing downward out of danger of engagement with the span wire or other overhead obstruction, should the current collector leave the trolley wire or the collector should strike an obstruction when the vehicle to which it is attached is backed up, while the other part of the pole, as for instance, that part secured to the vehicle, may continue to rise under action of the springs tending under normal conditions to keep the collector in engagement with the trolley wire.

My invention resides in the new and novel construction, combination and relation of the various parts hereinafter more fully described and set forth and shown in the drawing accompanying this specification.

In the accompanying drawing:

Fig. 1 is a side view in elevation of a trolley pole mounted on a car with the current collector in engagement with the trolley wire and my invention interposed between the ends of the trolley pole.

Fig. 2 is a side view in elevation of that portion of the pole shown in Fig. 1 embodying my invention with the parts in normal working relation.

Fig. 3 is a side view in elevation of that portion of Fig. 1 embodying my invention in which the parts have been forced out of normal relation and are in a position to swing out of alinement as hereinafter described.

Fig. 4 shows in partial section that portion of my invention shown in Fig. 3 with the parts swung out of alinement.

Fig. 5 is a top view in partial section of Fig. 2 taken on the line 5—5.

Fig. 6 is a top plan view of a modified form of device embodying my invention under normal working conditions.

Fig. 7 is a side plan view of Fig. 6.

Fig. 8 is a side plan view of a modified form of my invention shown in Figs. 6 and 7 in which the device is constructed to collapse if it should strike an overhead support sufficiently hard in order to avoid the pole striking a second overhead supporting structure for the trolley wire.

In the preferred form of construction I employ a trolley base B which may be of any of the well known types in use, and which is shown as mounted upon the roof of a car C. The springs S tend to elevate the pole P and maintain the current collector A in engagement with the trolley wire T, all of which is well known in common construction and practice, and for which I lay no claim.

The base B is provided with a split socket 1 in which is inserted one end of the attachment shown in Figs. 2, 3, 4 and 5, and which attachments embody my invention. The socket can be adjusted as to size and made to clamp by means of the cap screws 2. The opposite end of the attachment shown in Figs. 2, 3, 4 and 5 is provided with a split socket 3 to receive the end of the pole P and the socket is clamped on to the pole P by means of the cap screws 4. The attachment shown in Figs. 2, 3, 4 and 5 comprise two parts which are normally held with their axes in alinement, but which are capable of pivoting out of alinement as herein later described.

One portion of the attachment is provided with a tapered end 5 to fit in the socket 1 of the base B. The other end is provided with a forked arrangement and having the inner oppositely disposed faces of the forks each provided with a longitudinal channel 6 and an entension thereof 7. Interposed between the channels 6 and 7 on the inner face of each fork is a transverse channel 8. The other part of the attachment besides being provided with the socket and clamping bolt 4 is provided with a tongue 9 adapted to fit into the fork end of the first described part of the attachment. The oppositely disposed faces of the tongue 9 are each provided with a pair of circular bosses 10 and a pair of circular bosses 11 forming pivots. The tongue 9 is adapted to fit between the forks of the adjacent member and to pivot therein under certain conditions. The bosses 10 and 11 are adapted to be positioned in the channels 6 and 7 respectively as shown in Figs. 2 and 5. When positioned in this manner it will be noted that the two portions of the attachment will be held with their axes in alinement, but that the space from the boss 10 to the closed end of the channel 6 (see Figs. 1 and 5) will permit the two members to slide back and forth or telescope respectively. To prevent this sliding action under normal operating conditions, a hole 12 extends through the tongue 9, the bosses 11 and through the forked members 13 and in this recess 12 is inserted a shear pin 14. This shear pin may be made of various kinds of wood or it may be made of metal, the size and material depending upon the force desired to resist shearing. It will be obvious that when the shear pin 14 is in place that the parts are held rigidly together in alinement and against telescopic action, but if for any reason the pin 14 should shear the two parts making up the attachment can telescope as shown in Fig. 3. When this takes place the bosses 11 come opposite the channel 8 and the weight of the pole P and current collector A will cause the outer end of the attachment, together with the pole and collector, to drop down and pivot about the bosses 10 as shown in Fig. 4.

In assembling the two parts of the attachment the bosses 10 of one part are first inserted in the channels 8 until they are centrally positioned with respect to the axis of the channels 6 in the other part and the bosses 10 are then moved into the channels 6. The part to which the bosses 11 are attached is then pivoted about the bosses 10 until the bosses 11 are entered in the channels 8 and into alinement with the channels 7. The parts are then drawn outwardly until the holes 12 in the parts are in alinement, and a shear pin 14 is then inserted therein.

Under operating conditions, especially in mine work, it is frequently desired to operate the locomotive backward, as well as forward, and the operator does this without taking the time to turn his trolley pole and current collector. When operating the pole backward there is a great liability of the pole jumping the wire and the current collector engaging with the obstructions secured to the mine roof or with the roof of the mine itself. When this happens with the ordinary type of construction, the pole is either bent or broken, or damage results to some other part of the equipment. But, with a locomotive equipped with my invention, it will be apparent that if the pole in backing should strike an obstruction that the pin 14 will be sheared, permitting the parts to telescope until the bosses 11 coincide with the channels 8 when the weight of the pole will cause the outer part and the pole to pivot about the bosses 10 and the bosses 11 pass downwardly through the channels 8 and out of engagement with the mine roof.

In Figs. 6, 7 and 8 I have shown a modification adapted for use on street and interurban cars in which I employ a shear pin so arranged as to shear if the pole should leave the trolley conductor and should strike an overhead span or support.

In this arrangement I employ an attachment comprising two parts as before, but the tongue 20 of one part is permanently pivoted between the forks 21 of the other part by means of the bolt and nut 22—23. In order to maintain the parts in alinement for normal operation, the parts are drilled with coinciding holes and the shear pin 24 inserted therein.

It will be quite evident that with the modification just described that when the trolley pole flies upwardly and strikes a span wire that considerable stress will be brought upon the shear pin 24 and if this stress exceeds the strength of the shear pin the pin will be sheared and the outer portion of the pole allowed to drop down automatically through gravity.

It will be quite evident also that with my arrangement just described it is a very simple matter to re-adjust the parts to normal and maintain them in normal condition by simply inserting the shear pin in which case the arrangement embodying my invention is ready for normal and emergency operation.

There are no doubt many modifications which will occur to those skilled in the art, therefore, I do not wish to be limited other than by my claims.

I claim:

1. A support comprising a pair of interfitting tongued and grooved members pivotally held together and normally in alinement, the inner faces of the grooved member having oppositely disposed longitudinal channels and a cross channel, means on the tongued member to be positioned in the channel and about which the members pivot, other means on the tongued member to interlock with the channel to maintain the members in alinement and means interlocking with the members to hold the members against relative movement but to permit movement when the stress upon the members in a longitudinal direction exceeds a predetermined amount.

2. A support comprising a pair of interfitting members pivotally and telescopically mounted relative to each other, means to maintain the members in a normally alined but telescopic relation, means to maintain the members in an extended relation while in an alined relation under normal conditions and means permitting the members to pivot out of alinement when the members are retracted under abnormal conditions as described.

3. A support comprising a pair of interfitting members pivotally and telescopically mounted relative to each other, means to maintain the members under normal conditions in an extended relation and in alinement and to permit the members to retract and pivot out of alinement under abnormal conditions as described.

4. A support comprising a pair of members pivotally and telescopically mounted relative to each other, shear means to maintain them against relative telescopic movement under normal conditions but to permit the members to retract and pivot relative to each other under abnormal conditions as described.

5. A support comprising a pair of members pivotally and telescopically mounted relative to each other, means to maintain the members in an alined relation when in an extended relation, means to permit the members to pivot out of alinement when in a retracted relation and means to maintain the members in an extended relation under normal working conditions but to permit the members to retract under abnormal conditions as described.

6. A support comprising a pair of members pivotally and telescopically mounted relative to each other, means to maintain the members in an alined relation when in an extended relation, means to permit the members to pivot out of alinement when in a retracted relation and shear means to maintain the members in an extended relation under normal working conditions but to permit the members to retract under abnormal conditions as described.

7. A support comprising a pair of members telescopically mounted relative to each other, means to maintain the members in an alined relation when the members are in an extended relation and a shear means to maintain the members in an extended relation under normal conditions as described.

8. A support comprising a pair of members telescopically mounted relative to each other, means to maintain the members in an alined relation when the members are in an extended relation and a shear means to permit the members to retract telescopically when stress in excess of a predetermined amount is brought against the members as described.

9. A support comprising a pair of longitudinally and pivotally movable members, means permitting the members to move longitudinally of each other and lock against pivotal movement when moved in one direction and to pivot when moved relative to each other in the opposite direction and shear means to prevent the longitudinal movement of the members until the longitudinal stress upon the members exceeds the strength of the shear means.

10. A support comprising a pair of interfitting members pivotally and telescopically mounted relative to each other, yielding means to maintain the members under normal conditions in an extended relation and in alinement and to permit the members to retract and pivot out of alinement under abnormal conditions as described.

In testimony whereof I affix my signature.

ARTHUR C. WOOD.